United States Patent
Xu

(10) Patent No.: US 10,413,848 B2
(45) Date of Patent: *Sep. 17, 2019

(54) SCUM CONCENTRATION DEVICE

(71) Applicant: DALIAN YOOQI WATER TREATMENT TECHNOLOGY CO.LTD, Dalian (CN)

(72) Inventor: Yin Xu, Dalian (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/844,545

(22) Filed: Dec. 17, 2017

(65) Prior Publication Data

US 2018/0104621 A1 Apr. 19, 2018

Related U.S. Application Data

(63) Continuation of application No. PCT/CN2016/074534, filed on Feb. 25, 2016.

(51) Int. Cl.
*B01D 17/028* (2006.01)
*B01D 17/032* (2006.01)
(Continued)

(52) U.S. Cl.
CPC .......... *B01D 21/02* (2013.01); *B01D 17/0211* (2013.01); *B01D 17/0214* (2013.01);
(Continued)

(58) Field of Classification Search
CPC ............ B01D 17/0211; B01D 17/0214; B01D 21/0045; B01D 21/2433; E02B 15/105; E02B 15/106
(Continued)

(56) References Cited

U.S. PATENT DOCUMENTS 2,090,813 A * 8/1937 Schumacher ...... B01D 17/0211
210/522
3,447,683 A * 6/1969 Luce, Jr. ............ B01D 21/2438
210/540
(Continued)

FOREIGN PATENT DOCUMENTS

CN 105174366 A 12/2015
CN 205007709 U 2/2016
(Continued)

OTHER PUBLICATIONS

International Search Report of PCT/CN2016/074534, dated Nov. 30, 2016.

*Primary Examiner* — Christopher Upton
(74) *Attorney, Agent, or Firm* — Erson IP (Nelson IP)

(57) ABSTRACT

A scum or floating oil concentration device comprises a scum or floating oil concentration cone (11) and a scum or floating oil conveyor (12). Said scum or floating oil conveyor (12) is arranged above said scum or floating oil concentration cone (11). Said scum or floating oil conveyor (12) comprises a conveying helix (1) rotating around a shaft, a scum or floating oil conveying pipe (2) and a skimmer (3). Said conveying helix (1) is arranged inside said scum or floating oil conveying pipe (2). An opening is arranged on said scum or floating oil conveying pipe (2). Said skimmer (3) is arranged at said opening of said scum or floating oil conveying pipe (2). An inclined separation plate (13) and a scum or floating oil collection and concentration system are further provided in the present invention.

2 Claims, 5 Drawing Sheets

(51) Int. Cl.
 *B01D 21/02* (2006.01)
 *B01D 21/24* (2006.01)
 *B01D 17/02* (2006.01)
 *B01D 17/04* (2006.01)
 *B01D 21/00* (2006.01)

(52) U.S. Cl.
 CPC ....... *B01D 17/045* (2013.01); *B01D 21/0045* (2013.01); *B01D 21/24* (2013.01); *B01D 21/2433* (2013.01); *B01D 21/2438* (2013.01)

(58) Field of Classification Search
 USPC .................. 210/521, 522, 525, 540, 776
 See application file for complete search history.

(56) References Cited

U.S. PATENT DOCUMENTS

| | | | | | |
|---|---|---|---|---|---|
| 5,028,333 | A | * | 7/1991 | Wright | B01D 17/0211 |
| | | | | | 210/521 |
| 5,188,729 | A | * | 2/1993 | Krofta | B01D 21/0045 |
| | | | | | 210/540 |
| 5,538,631 | A | * | 7/1996 | Yeh | B01D 21/2433 |
| | | | | | 210/521 |
| 6,267,877 | B1 | * | 7/2001 | Bianco | B01D 17/0214 |
| | | | | | 210/540 |
| 6,277,273 | B1 | * | 8/2001 | Gore | B01D 17/0214 |
| | | | | | 210/540 |
| 6,364,123 | B1 | * | 4/2002 | Suhr | B01D 21/2433 |
| | | | | | 210/525 |
| 7,449,121 | B2 | | 11/2008 | Toumikoski | |
| 8,277,652 | B2 | * | 10/2012 | Urquhart | B01D 21/2433 |
| | | | | | 210/540 |
| 2007/0221587 | A1 | | 9/2007 | Tuomikoski | |
| 2010/0243585 | A1 | * | 9/2010 | Dissinger | B01D 21/0045 |
| | | | | | 210/521 |
| 2011/0017680 | A1 | * | 1/2011 | Tuomikoski | B01D 21/2433 |
| | | | | | 210/776 |
| 2012/0312740 | A1 | * | 12/2012 | Roberts | B01D 21/0045 |
| | | | | | 210/521 |
| 2018/0104623 | A1 | * | 4/2018 | Xu | B01D 17/0214 |

FOREIGN PATENT DOCUMENTS

| | | | |
|---|---|---|---|
| CN | 105521625 A | | 4/2016 |
| CN | 205391805 U | | 7/2016 |
| CN | 205516682 U | | 8/2016 |
| EP | 229624 | * | 7/1987 |
| KR | 100712962 B1 | | 5/2007 |

\* cited by examiner

SCUM CONCENTRATION DEVICE

CROSS-REFERENCE TO RELATED APPLICATIONS

This application is a continuation of International Patent Application No. PCT/CN2016/074534 with a filing date of Feb. 25, 2016, designating the United States, now pending. The content of the aforementioned application, including any intervening amendments thereto, are incorporated herein by reference.

TECHNICAL FIELD

The present invention relates to a scum or floating oil treatment device, in particular to a scum or floating oil or tramp oil concentration device.

BACKGROUND OF THE PRESENT INVENTION

Scum or floating oil or floating oil separation device has been widely used in liquid separation industry, such as grease trap, oil water separator, etc. The scum or floating oil or floating oil separated by these devices will be discharged through a skimming pipe or by a scum or floating oil scraper. However, a large amount of raw liquid constituents are contained in the scum or floating oil or floating oil discharged from these scum or floating oil or floating oil separation devices in current application. A relatively high percentage of raw liquid content is contained in the scum or floating oil or floating oil, which cannot return to original system for recycling, hence causing a significant waste of raw liquid. Furthermore, the scum or floating oil containing a large amount of raw liquid increases the workload of the next step. Besides, the scum or floating oil is easily deteriorated during the process of being gathered and concentrated on the surface of these separation devices, giving out an odor to the surrounding environment, causing pollution. Moreover, it is very difficult for the existing scum or floating oil separation devices to effectively and promptly remove high-viscosity and high-concentration scum or floating oil to the outside of the separation devices. The main causes for above defects include: 1) unreasonable design of concentration device; scum or floating oil cannot be concentrated for a long period of time in the device, so as to reduce the liquid content of the scum or floating oil; 2) during the scum or floating oil collection process, a conventional skimming pipe or scum or floating oil scraper relies on scum or floating oil gravity or the scum or floating oil scraper pushes the scum or floating oil to the scum or floating oil receiving mouth; the process when the scum or floating oil moves laterally on the liquid surface interferes with the normal separation, and scum or floating oil movement will cause loss of buoyancy by a part of scum or floating oil, allowing it to fall into the raw liquid, thus negatively affecting the separation. In order to solve this difficult problem, there is a scum or floating oil collection method in prior art in which the scum or floating oil is scooped out of the liquid surface by a spoon. This scum or floating oil-collecting process avoids the lateral movement of the scum or floating oil, having less interference to the separation, but the scum or floating oil scooped into the scum or floating oil conveying pipe still need to be discharged on gravity. Thus, the device requires scum or floating oil to have a certain degree of liquidity; for scum or floating oil having a low liquid content, high viscosity and low fluidity, the device will fails to discharge it. In addition, it is difficult for the device to obtain scum or floating oil with low raw liquid content and high concentration.

SUMMARY OF PRESENT INVENTION

Targeting at solving problems found in prior art, for example, lack of concentration area in scum or floating oil separation devices, failure to obtain high concentration and low raw liquid content scum or floating oil, high interference during scum or floating oil collection process negatively impacting separation, scum or floating oil's falling into raw liquid, etc., the present invention provides a scum or floating oil concentration device which can effectively collect and discharge high concentration, high viscosity and low fluidity scum or floating oil, and said scum or floating oil concentration device can reduce discharge of raw liquid to half of that in prior art.

The technical solution of the present invention is: a scum or floating oil concentration device, comprising a scum or floating oil conveyor and a scum or floating oil concentration cone; said scum or floating oil conveyor is arranged above said scum or floating oil concentration cone; said scum or floating oil conveyor comprises a conveying helix rotating around a shaft, a scum or floating oil conveying pipe and a skimmer; said conveying helix is arranged inside said scum or floating oil conveying pipe; an opening is arranged on said scum or floating oil conveying pipe; a skimmer is arranged at said opening of said scum or floating oil conveying pipe.

Further, said skimmer is fan-shaped; the skimmer scoops scum or floating oil into the skimmer; the scooping action will disturb the scum or floating oil to a minimum extent, and reduce the amount of scum or floating oil falling into the raw liquid due to loss of buoyancy.

Further, said scum or floating oil concentration cone is narrow on the upper side and wide on the lower side; a trapezium or a vertebral column which is narrow on the upper side and wide on the lower side is acceptable. Such structure having narrow upper side and wide lower side causes scum or floating oil more easily to be gathered in the concentration cone; during the gathering and rising process of the scum or floating oil, the extruding effect among scum or floating oil will remove the raw liquid and achieve concentration; when the scum or floating oil concentration reaches the level required the skimmer, the scooping action of the skimmer can realize skimming. Compared with structures such as column or rectangle, the structure having narrow upper side and wide lower side can significantly reduce the raw liquid content of the scum or floating oil, thus increasing the concentration of the scum or floating oil.

In order to achieve the purpose of separating the different density components in the raw liquid, a separation device is arranged under the scum or floating oil concentration cone; said separation device may also be other separation devices or storage devices in this field, which is not specifically limited in the present invention; a fluid inlet and a clear liquid outlet are arranged on the separation device.

Preferably, an inclined separation plate is arranged inside the separation device.

The scum or floating oil needs to be gathered to a certain concentration so that it can be skimmed, so there will be very long time of accumulation; but naturally a quite long time of the accumulation will see bacterial growth and other related issues. In order to prevent deterioration of the scum or floating oil during its concentration process in the scum or floating oil concentration cone for a long period of time, a disinfecting device is arranged between the scum or floating oil concentration cone and the scum or floating oil conveyor. The disinfecting device can not only eliminate the bacterial flora in the scum or floating oil, but also kill the bacterial flora in the raw liquid, achieving dual-disinfection effect for raw liquid and scum or floating oil at the same time.

Further, said disinfecting device is a UV disinfecting device, an ozone disinfecting device or a sterilizing-solution disinfecting device.

A second objective of the present invention is to provide an inclined separation plate used for the above-mentioned separation device. Said inclined separation plate is of a clamping structure with uniform liquid-gathering clamping plate; a sloping plate assembly is arranged inside the separation device; said sloping plate assembly includes a supporting plate, a multi-opening clamping plate, a sloping plate, a fastening plate and a collector pipe; both sides of said multi-opening clamping plate are fixed on the supporting plate; parallel sloping plate grooves are defined on said multi-opening clamping plate; said sloping plate is fixed on said multi-opening clamping plate by said sloping plate grooves; fluid passages are formed between sloping plates; a collector pipe is arranged at the end of said fluid passage; a hole is arranged on the surface of said collector pipe for fluid passing through; said multi-opening clamping plates are installed in parallel; the top of said multi-opening clamping plate is fixed by said fastening plate; the angle between said multi-opening clamping plate and the perpendicular direction is 30° to 70°, preferably 30°; said multi-opening clamping plate can also be composed of lathing, and the lower end of said lathing is fixed with the fastening plate.

The cross section of said sloping plate in the perpendicular direction has the same shape as the sloping plate groove; said sloping plate groove can be straight-line shaped, zigzag or wavelike, which is not specifically qualified by the present invention; said collector pipes are installed in the vicinity of each or every two fluid passage ends, so as to achieve uniform liquid-gathering purpose; the liquid collected by said collector pipes will be gathered to and discharged from the outlet.

A third objective of the present invention is to provide a scum or floating oil collection and concentration system. Said scum or floating oil collection and concentration system includes: a scum or floating oil concentration device comprising a scum or floating oil concentration cone and a scum or floating oil conveyor fixed on said scum or floating oil concentration cone, and an emulsion scum or floating oil collection device comprising a emulsion device and a floating weir skimmer; said scum or floating oil conveyor includes a conveying helix rotating around a shaft, a scum or floating oil conveying pipe and a skimmer, said conveying helix is arranged inside said scum or floating oil conveying pipe, an opening is arranged on said scum or floating oil conveying pipe, said skimmer is arranged at said opening of said scum or floating oil conveying pipe; a separation device is arranged under said scum or floating oil concentration cone; a fluid inlet and a clear liquid outlet are arranged on said separation device; said floating weir skimmer is arranged inside emulsion device; said floating weir skimmer includes a collecting box, a weir plate and an inner buoy; said collecting box includes a baffle plate and a trough; said trough is provided with a guide rail; an inner buoy is arranged inside said collecting box, a guide pulley is arranged on said inner buoy enabling said inner buoy to slide on said guide rail; a supporting member is also arranged on said inner buoy; one end of said weir plate is supported by said supporting member, and the other end is in rotation connection with said trough; a liquid outlet is arranged under said collecting box; said liquid outlet is connected with said fluid inlet of said scum or floating oil concentration device through a pipeline.

Further, the number of said emulsion scum or floating oil collection device is at least one set, said emulsion scum or floating oil collection device is connected with said scum or floating oil concentration device through a pipeline, and a pump is arranged on said pipeline.

Compared with the prior art, the present invention has the following beneficial effects:

The scum or floating oil concentration device in the present invention can achieve more than double scum or floating oil content in the skimmed scum or floating oil and less than half raw liquid discharge, which cannot be achieved by prior art in this field. Said scum or floating oil concentration device can be stably used for collection and conveying of high-concentration and high-viscosity scum or floating oil, and no problem of scum or floating oil deterioration will be seen after a long time of use. The purposes for both raw liquid separation and scum or floating oil concentration and collection can be achieved at the same time. The separation device in the scum or floating oil concentration device in the present invention is of a clamping structure with a uniform liquid-gathering clamping plate, which can reduce the workload in bonding or welding of the sloping plate, and avoid defects such as deformation produced in the welding or bonding or process of the sloping plate, complicated installation, high percentage of damage, etc. The uniform liquid-gathering structure can make liquid flow of every fluid passage the same, achieving the purpose of high-efficiency and high-precision separation of different density substances. The scum or floating oil concentration device in the present invention has a simple, economical and practical structure, with a wide scope of applications, suitable for large-scale promotion. The combination of the scum or floating oil concentration device and the emulsion scum or floating oil collection device is a scum or floating oil collection and concentration system, which can achieve continuous treatment of scum or floating oil gathering and discharge, reduce the waste of emulsion, lower down the labor costs and increase utilization of emulsion, showing a high system stability and high production efficiency.

In the figures; 1. conveying helix; 2. scum or floating oil conveying pipe; 3. skimmer; 4. scum or floating oil outlet; 5. clear liquid outlet; 6. separation device; 7. discharge pipe; 8. fluid inlet; 9. opening; 10. disinfecting device; 11. scum or floating oil concentration cone; 12. scum or floating oil conveyor; 13. inclined separation plate; 14. emulsion device; 15. floating weir skimmer; 16. Pump; 61. supporting plate; 62. multi-opening clamping plate; 63. sloping plate; 64. bolt; 65. fastening plate; 66. collector pipe; 150. collecting box;

151. weir plate; 152. inner buoy; 153. baffle plate; 154. trough; 155. guide rail; 156. guide pulley; 157. liquid outlet.

DETAILED DESCRIPTION OF PREFERRED EMBODIMENTS

The present invention is described in further detail with reference to the drawings and embodiments as follows. The following embodiments are used to illustrate the present invention, but not intended to limit the scope of the present invention.

Embodiment 1

Figure 1:
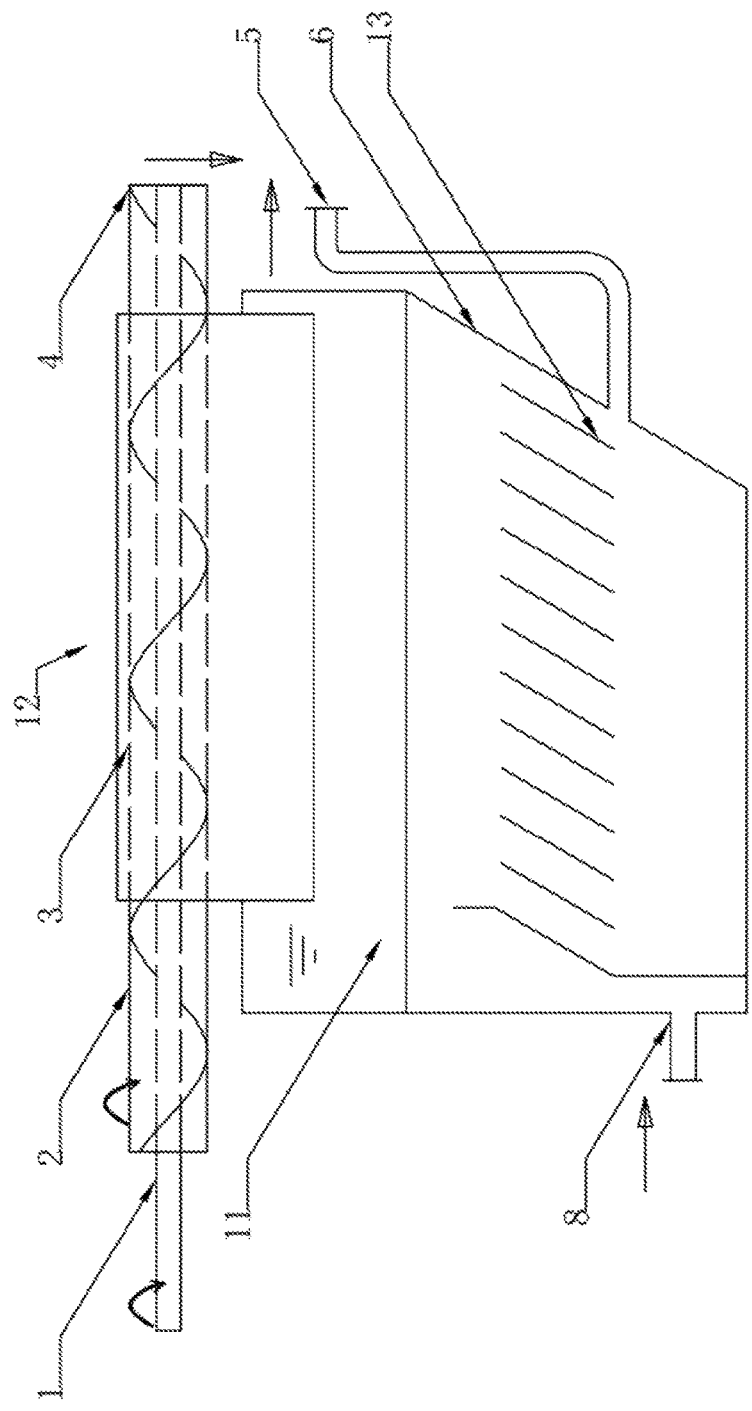
FIG. 1 is a structural diagram of a scum or floating oil concentration device according to a first embodiment of the present invention.
Figure 2:
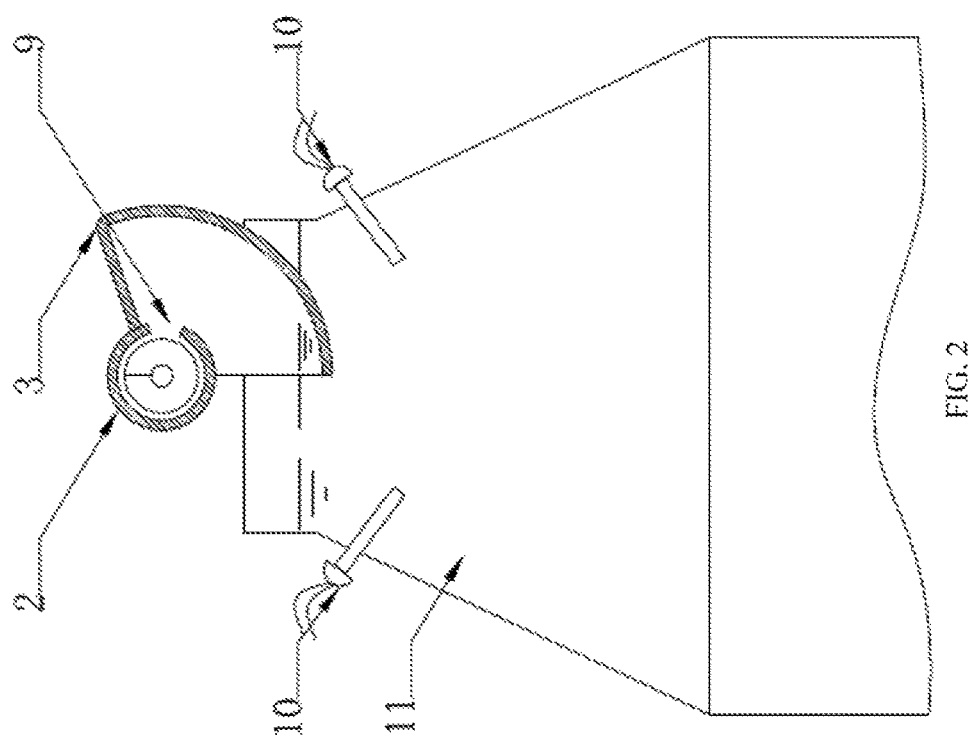
FIG. 2 is a structural diagram of a skimmer according to the first embodiment of the present invention.

As shown in FIGS. 1-2, the scum or floating oil concentration device includes a disinfecting device 10, a scum or floating oil concentration cone 11 and a scum or floating oil conveyor 12.

The following describes the structure of each part.

The scum or floating oil concentration cone 11 is of a trapezium where the upper side is narrow and the lower side is wide, and the scum or floating oil conveyor 12 is arranged above the scum or floating oil concentration cone 11.

The scum or floating oil conveyor 12 includes a conveying helix 1 rotating around a shaft, a scum or floating oil conveying pipe 2 and a skimmer 3. The conveying helix 1 is arranged inside the scum or floating oil conveying pipe 2. The opening 9 is arranged on the scum or floating oil conveying pipe 2. The fan-shaped skimmer 3 is arranged at the opening 9 on the scum or floating oil conveying pipe 2. The scum or floating oil outlet 4 is arranged on the scum or floating oil conveyor 12. The conveying helix 1 rotates and pushes dense scum or floating oil to and discharges the same from the outlet 4.

A disinfecting device 10 is arranged between the scum or floating oil concentration cone 11 and the scum or floating oil conveyor 12. Said disinfecting device 10 can be any type of disinfection and sterilization equipment in this field, such as UV disinfecting device, ozone disinfecting device or sterilizing-solution disinfecting device; UV disinfecting device is preferred in this embodiment.

A separation device 6 is provided under the scum or floating oil concentration cone 11. Said separation device 6 may be other separation devices or storage devices in this field. This embodiment employs a separation device 6 in which an inclined separation plate 13 is provided. A fluid inlet 8, a discharge pipe 7 and a clear liquid outlet 5 are arranged on the separation device 6.

The operating principle of said scum or floating oil concentration device is as follows: the raw liquid containing scum or floating oil enters from the fluid inlet 8, the scum or floating oil is concentrated by the scum or floating oil concentration cone 11, and the concentrated scum or floating oil will be disinfected and sterilized by the disinfecting device 10 and then discharged by the scum or floating oil conveyor 12. The raw liquid enters the separation device, which will be separated by the inclined separation plate 13, collected by the discharge pipe 7, and then discharged from the clear liquid outlet 5. A skimmer 3 is welded on the scum or floating oil conveying pipe 2, said skimmer 3 rotates with the scum or floating oil conveying pipe 2 and dumps the scooped scum or floating oil into the scum or floating oil conveying pipe 2 through the opening 9 on the scum or floating oil conveying pipe 2; then the scum or floating oil entering the scum or floating oil conveying pipe 2 through the opening 9 on the scum or floating oil conveying pipe 2 will be pushed by the rotating conveying helix 1 to and discharged from the scum or floating oil outlet 4. The rotation speed of the skimmer 3 and the conveying helix 1 will be determined by the amount and viscosity of the scum or floating oil.

Embodiment 2

Figure 3:
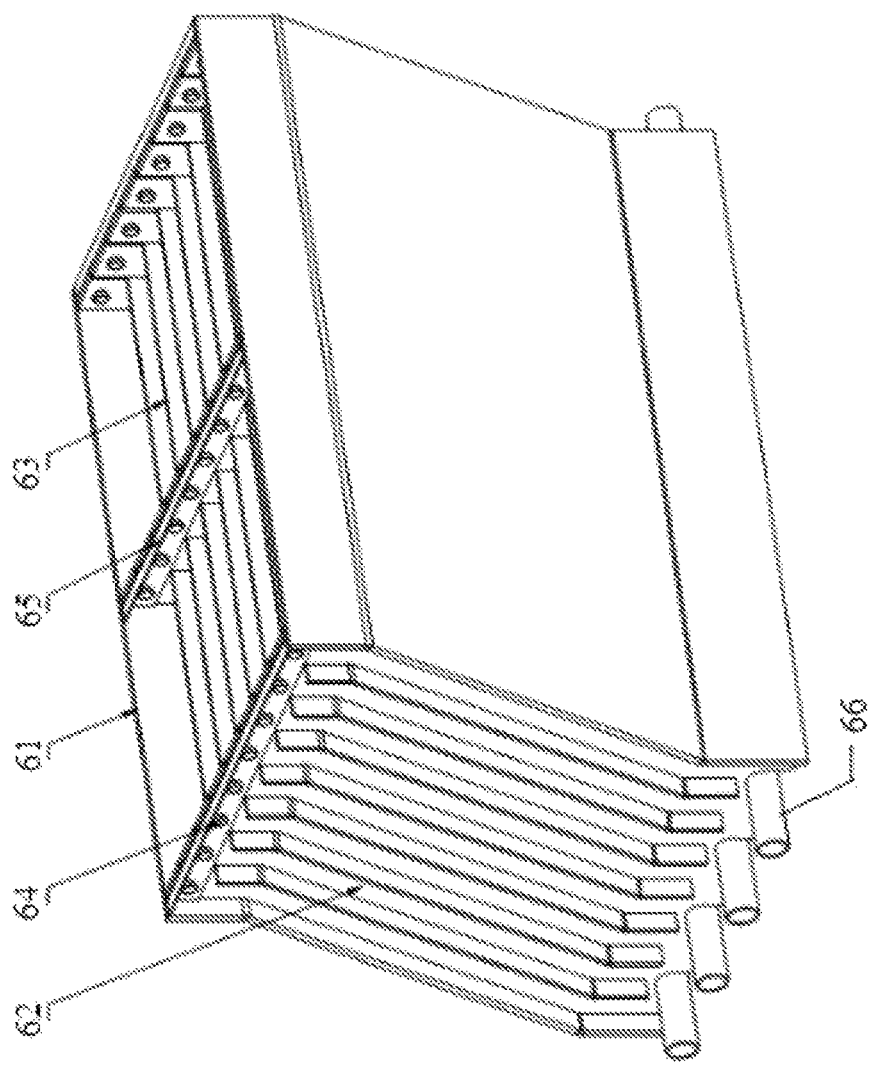
FIG. 3 is a structural diagram of a separation device according to a second embodiment of the present invention.

As shown in FIG. 3, a sloping plate separation assembly with a clamping structure with a uniform liquid-gathering clamping plate is provided in Embodiment 2. Said sloping plate assembly may replace the inclined separation plate 13 in Embodiment 1, installed in the separation device 6. Said sloping plate assembly includes a supporting plate 61, a multi-opening clamping plate 62, a sloping plate 63, a fastening plate 65 and a collector pipe 66. Both sides of the multi-opening clamping plate 62 are fixed on the supporting plate 61. The angle between the multi-opening clamping plate 62 and the perpendicular direction is 30°. The multi-opening clamping plates 62 are installed in parallel. More than one multi-opening clamping plate 62 may be arranged in parallel according to the strength of the sloping plate. Parallel sloping plate grooves are defined on the multi-opening clamping plate 62. The sloping plate 63 is fixed on the multi-opening clamping plate 62 by the sloping plate grooves. Fluid passages are formed between sloping plates 63. A collector pipe 66 is arranged at the end of said fluid passage. The top of the multi-opening clamping plate 62 is tightly held by the fastening plate 65 and fixed by bolt 64. The collector pipe 66 is a perforated pipe; each said collector pipe has the same number and aperture of holes, so as to achieve the purpose of uniform liquid gathering. Said collector pipes 66 are installed in the vicinity of each or every two fluid passage ends, so as to make the amount of liquid collected by each fluid passage the same, and also make the separate load reaching each sloping plate the same. The liquid collected by said collector pipes 66 may be gathered to and discharged from the collecting and discharging pipe 7.

Embodiment 3

Figure 4:
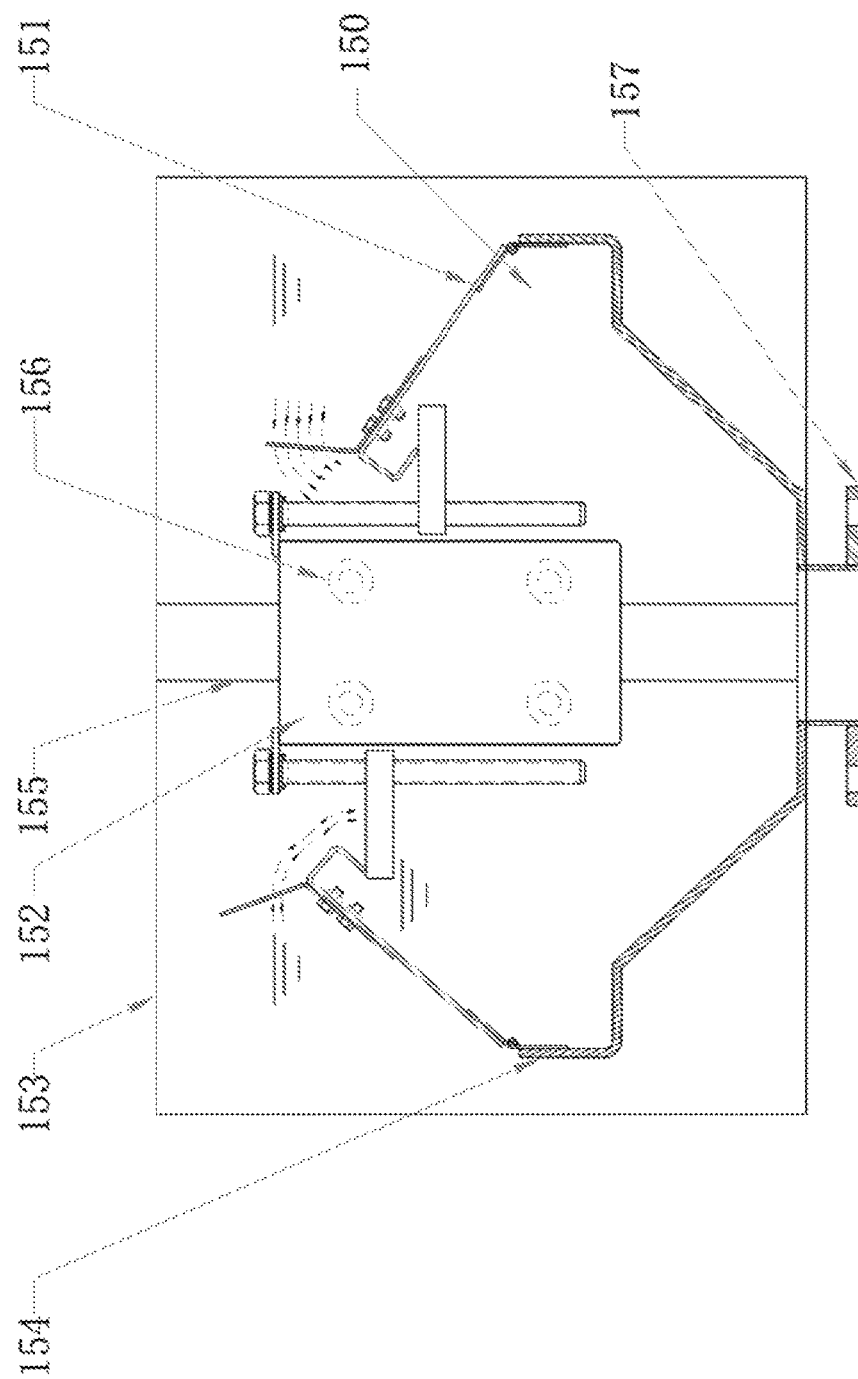
FIG. 4 is a structural diagram of a floating weir skimmer according to the present invention.
Figure 5:
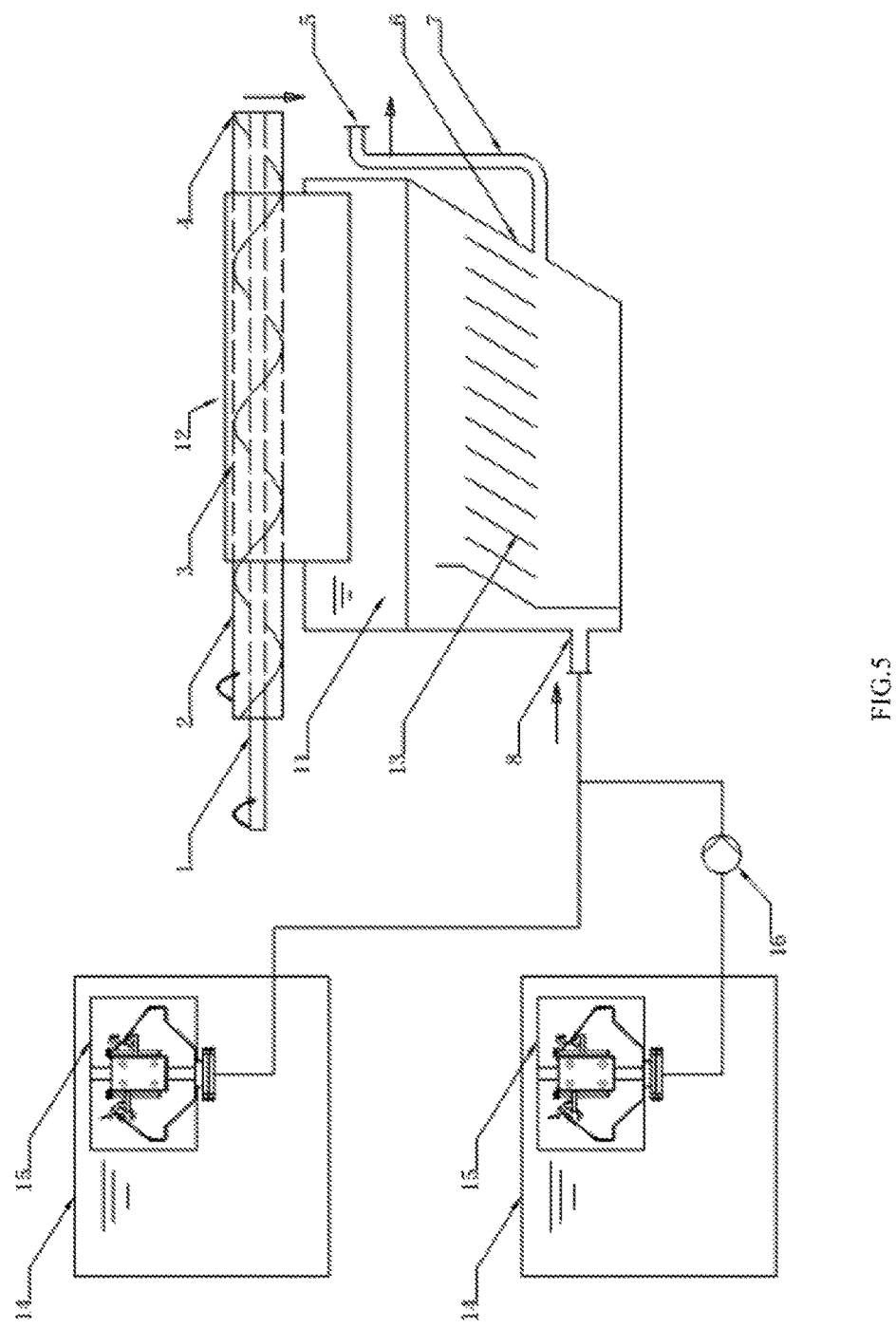
FIG. 5 is a structural diagram of a scum or floating oil collection and concentration system according to the present invention.

As shown in FIGS. 4-5, a scum or floating oil collection and concentration system is provided in Embodiment 3. The scum or floating oil collection and concentration system comprises a scum or floating oil concentration device comprising a scum or floating oil concentration cone 11 and a scum or floating oil conveyor 12 fixed on said scum or floating oil concentration cone 11, and an emulsion scum or floating oil collection device comprising a emulsion device 14 and a floating weir skimmer 15.

The scum or floating oil concentration cone 11 is of a trapezium where the upper side is narrow and the lower side is wide. Said scum or floating oil conveyor 12 includes a conveying helix 1 rotating around a shaft, a scum or floating oil conveying pipe 2 and a skimmer 3. Said conveying helix 1 is arranged inside said scum or floating oil conveying pipe 2. An opening 9 is arranged on said scum or floating oil conveying pipe 2. Said fan-shaped skimmer 3 is arranged at said opening 9 of said scum or floating oil conveying pipe 2. A scum or floating oil outlet 4 is arranged on said scum or floating oil conveyor 12. The conveying helix 1 rotates and pushes the scum or floating oil to and discharges the same from said scum or floating oil outlet 4. A separation device 6 is arranged under said scum or floating oil concentration cone 11. An inclined separation plate 13 is arranged inside said separation device 6. A fluid inlet 8, a discharge pipe 7 and a clear liquid outlet 5 are arranged on said separation device 6. A disinfecting device 10 may also be arranged between said scum or floating oil concentration cone 11 and said scum or floating oil conveyor 12. Said disinfecting device 10 can be any type of disinfection and sterilization equipment in this field, such as UV disinfecting device, ozone disinfecting device or sterilizing-solution disinfecting device; UV disinfecting device is preferred in this embodiment.

Said emulsion device 14 may be art emulsion storage tank or a vacuum filter, etc. Said floating weir skimmer 15 is arranged inside said emulsion device 14. The skimmer may be fixed on said emulsion device 14, or float on the liquid surface of said emulsion device 14 with the help of a floater. Said floating weir skimmer 15 comprises a collecting box 150, a weir plate 151 and an inner buoy 152. Said collecting box 150 comprises two baffle plates 153 and one trough 154. Said trough 154 is provided with a guide rail 155. An inner buoy 152 is arranged inside said collecting box 150. A guide pulley 156 is arranged on both ends of said inner buoy 152 enabling said inner buoy 152 to slide on said guide rail 155. Said inner buoy 152 floats with the help by the liquid buoyancy in said collecting box 150. The level changes in said collecting box 150 enables said inner buoy 152 to float along said guide rail 155 relying on said guide pulley 156. A supporting member is also provided on said inner buoy 152. One end of said weir plate 151 is supported by a supporting member, and the other end is connected to said trough 154. Said supporting member includes an adjustable bolt and a carrying block. Said carrying block is fixed on said adjustable bolt. Said carrying block can reach a certain height by adjusting the bolt, so as to determine the initial weir crest height. In this embodiment, said weir plate 151 is double-side weir plate; namely, both sides of said inner buoy 152 are provided with said weir plate 151. Said weir plate 151 is in rotation connection with said trough 154. Said rotation connection may also be other connection methods conventionally used in this field, as long as the rotation of said weir plate 151 can be achieved. Hinge connection is preferred in this embodiment. Said weir plate 151 presses on the carrying block relying on its own gravity and moves with said carrying block moving up and down. Weir crest and weir are arranged on said weir plate 151 with an interval. Fluid flows into said collecting box 150 from weir crest. The weir crest height on both sides of the double-side weir plate may vary with the amounts of scum or floating oil on both sides. Said weir plate 151 may also be a single-side weir plate, with the other side being enclosed, collecting scum or floating oil on a single side.

A liquid outlet 157 is also arranged under said collecting box 150. Said liquid outlet 157 is connected with the fluid inlet 8 of the scum or floating oil concentration device. Said emulsion scum or floating oil collection device, which may be field storage tank or vacuum filter, may be one set or more than one set. This embodiment provides two sets of emulsion scum or floating oil collection device, which are connected with the scum or floating oil concentration device through a pipeline. A pump 16 may be installed on said pipeline.

The operating principle of the scum or floating oil collection and concentration system is as follows: during the collection process of the emulsion scum or floating oil, the scum or floating oil inside the emulsion device 14 will be collected by the floating weir skimmer 15; open the liquid outlet 157, the liquid level in the collecting box 150 will decrease; the inner buoy 152 will float due to changes of liquid level in the collecting box 150; the inner buoy 152 moves downwards, driving the adjustable bolt and the carrying block to also move downwards, further driving the weir plate 151 to rotate; the scum or floating oil outside the trough 154 will enter the collecting box 150 through the crest of weir; after finishing collection, close the liquid outlet 157, the inner buoy 152 and the weir plate 151 will return to their original positions.

When the liquid level of the floating weir skimmer 15 in the emulsion device 14 is higher than the scum or floating oil concentration device, the liquid can flow automatically into the scum or floating oil concentration device; when the liquid level of the floating weir skimmer 15 in the emulsion device 14 is lower than the scum or floating oil concentration device, a pump 16 may be used for pumping the liquid into the scum or floating oil concentration device. The scum or floating oil entering through the fluid inlet 8 of the separation device 6 will be separated by the inclined separation plate 13, and the clear liquid after separation will be discharged from the clear liquid outlet 5 and then recycled. Since scum or floating oil is accumulated in the scum or floating oil concentration cone 11; when the scum or floating oil becomes concentrated, it may be deteriorated and moldy; at this time, the disinfecting device 10 needs to be engaged for disinfection and sterilization of the scum or floating oil, as well as for disinfection and sterilization of the liquid in the separation device 6; when the concentration of scum or floating oil reaches a certain level, the skimmer 3 needs to be engaged to scoop out the dense scum or floating oil and dump the same into the scum or floating oil conveying pipe 2, and at the same time, open the screw conveyor 1 to push the dense scum or floating oil dumped into the conveying pipe to the outlet 4 for discharge. The dense scum or floating oil has a low liquid content but a high scum or floating oil concentration, thus saving a large amount of raw liquid.

The above-mentioned are only preferred embodiments of the present invention. However, the protection scope of the present invention is not limited to above-mentioned embodiments. Any equivalent substitution or changes made by one of ordinary skill in the art under the teaching of the present invention falls into the protection scope of the present invention.

I claim:

1. A scum or floating oil collection and concentration system, comprising:
 a scum or floating oil concentration device comprising a scum or floating oil concentration cone and a scum or floating oil conveyor fixed on said scum or floating oil concentration cone, wherein said scum or floating oil conveyor includes a conveying helix rotating around a shaft, a scum or floating oil conveying pipe and a skimmer; said conveying helix is arranged inside said scum or floating oil conveying pipe; an opening is arranged on said scum or floating oil conveying pipe; said skimmer is arranged at said opening of said scum or floating oil conveying pipe; a separation device is attached to a bottom of said scum or floating oil concentration cone; the separation device comprises a fluid inlet and a clear liquid outlet; when a raw liquid containing scum or floating oil enters the separation device through the fluid inlet, the separation device is configured to separate the raw liquid into a clear liquid and a scum or floating oil; wherein the scum or floating oil is delivered to the scum or floating oil concentration cone, and the clear liquid is output from the clear liquid outlet; and a disinfecting device is arranged between the scum or floating oil concentration cone and the scum or floating oil conveyor; and an emulsion scum or floating oil collection device comprising an emulsion device and a floating weir skimmer, wherein said floating weir skimmer is arranged inside said emulsion device; said floating weir skimmer includes a collecting box, a weir plate and an inner buoy; said collecting box includes a baffle plate and a trough; said trough is provided with a guide rail: an inner buoy is arranged inside said collecting box; a guide pulley is arranged on said inner buoy enabling said inner buoy to slide on said guide rail; a supporting member is also arranged on said inner buoy; a first end of said weir plate is supported by said supporting member, and a second end of said weir plate is in rotation connection with said trough; a liquid outlet is arranged under said collecting box; and said liquid outlet is connected with said fluid inlet of said separation device through a first pipeline.

2. The scum or floating oil collection and concentration system according to claim 1, wherein a second emulsion scum or floating oil collection device is connected to said scum or floating oil concentration device through a second pipeline, and a pump is arranged on said second pipeline.

\* \* \* \* \*